United States Patent [19]
Barton et al.

[11] 3,879,007

[45] Apr. 22, 1975

[54] VEHICLE SEAT

[75] Inventors: James C. Barton, Peoria; Jon C. Christensen, Washington; James P. Mueller, East Peoria; Larry W. Sprinkle, Decatur, all of Ill.

[73] Assignee: Caterpillar Tractor Company, Peoria, Ill.

[22] Filed: Dec. 7, 1973

[21] Appl. No.: 422,879

Related U.S. Application Data

[62] Division of Ser. No. 241,640, March 6, 1972, Pat. No. 3,788,697.

[52] U.S. Cl. ............... 248/400; 188/311; 137/599
[51] Int. Cl. ............................................ A47b 95/00
[58] Field of Search ............ 248/400; 188/319, 282, 188/311; 137/629, 599, 512.1

[56] References Cited
UNITED STATES PATENTS

| | | | |
|---|---|---|---|
| 2,195,867 | 4/1940 | Mallory | 137/599 |
| 2,381,553 | 8/1945 | Mott | 277/43 |
| 2,760,552 | 8/1956 | Decker | 248/400 |
| 3,036,844 | 5/1962 | Vogel | 188/319 |
| 3,150,855 | 9/1964 | Carter | 248/400 |
| 3,168,278 | 2/1965 | Ogden | 248/400 |
| 3,215,386 | 11/1965 | Swenson | 248/400 |
| 3,308,619 | 3/1967 | Richardson et al. | 138/599 |
| 3,375,845 | 4/1968 | Behm | 137/599 |
| 3,420,341 | 1/1969 | Keehn | 188/319 |
| 3,430,444 | 3/1969 | Kamp | 248/400 |
| 3,436,048 | 4/1969 | Greer | 248/400 |
| 3,559,776 | 2/1971 | Schultze | 188/319 |
| 3,706,362 | 12/1972 | Faure | 188/282 |

FOREIGN PATENTS OR APPLICATIONS

| | | | |
|---|---|---|---|
| 1,287,455 | 1/1969 | Germany | 188/282 |
| 1,031,465 | 3/1953 | France | 188/311 |
| 1,095,276 | 12/1954 | France | 188/319 |
| 1,372,573 | 4/1964 | France | 248/400 |
| 571,871 | 1/1958 | Italy | 188/319 |
| 610,719 | 10/1960 | Italy | 188/319 |

*Primary Examiner*—Marion Parsons, Jr.
*Attorney, Agent, or Firm*—Phillips, Moore, Weissenberger, Lempio & Strabala

[57] ABSTRACT

An improved vehicle seat wherein a bottom cushion assembly is pivotally attached to a back and resiliently mounted upon a base by an oscillation damping member to control oscillation of said vehicle seat with respect to the base. The back is pivotally joined to the base by substantially parallel links which maintain the back at a constant angle of inclination with respect to the base independent of elevational displacement. A swing link, pivotally connecting the bottom cushion assembly to the base permits the bottom cushion assembly to pivot about an imaginary point forward of the seat approximating the knee joint of an operator to minimize movement of the operator's feet relative to the vehicle. A hydraulic circuit associated with a hydropneumatic suspension for such a seat includes dual damping capabilities for accommodating both normal and high impact loads on the seat.

2 Claims, 5 Drawing Figures

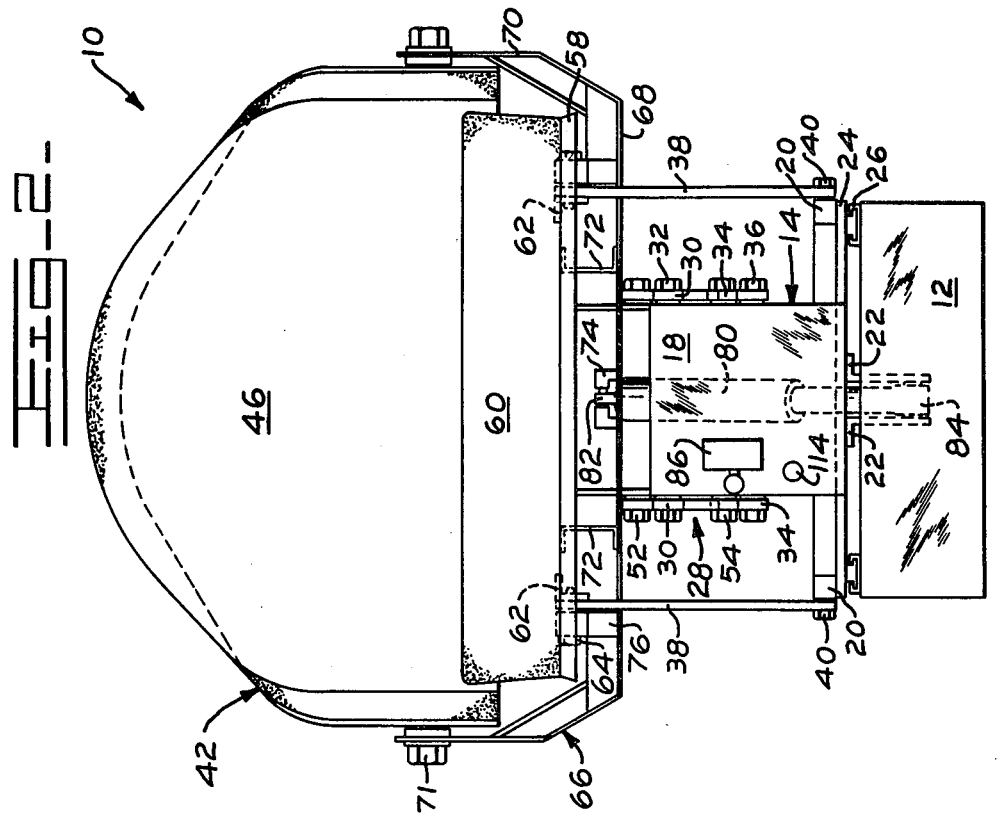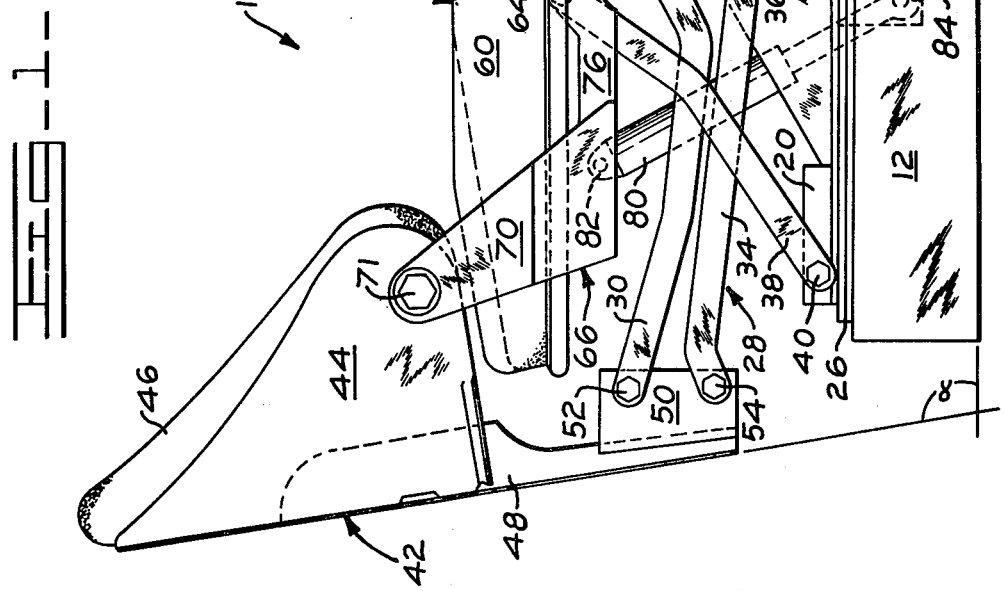

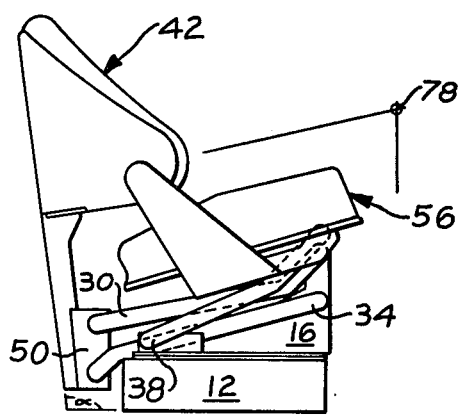
Fig-3-
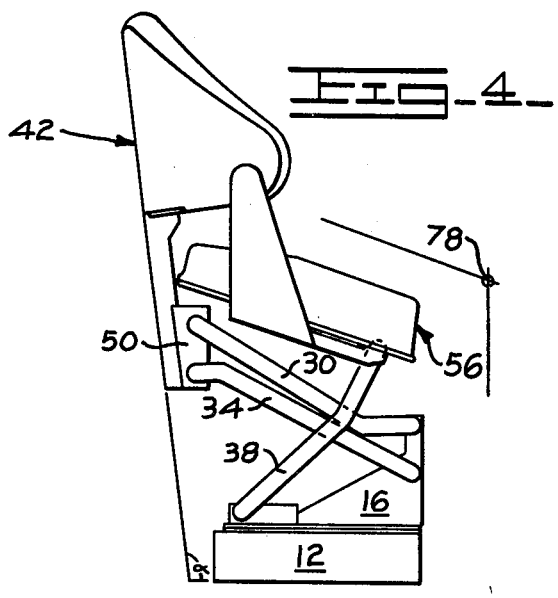
Fig-4-
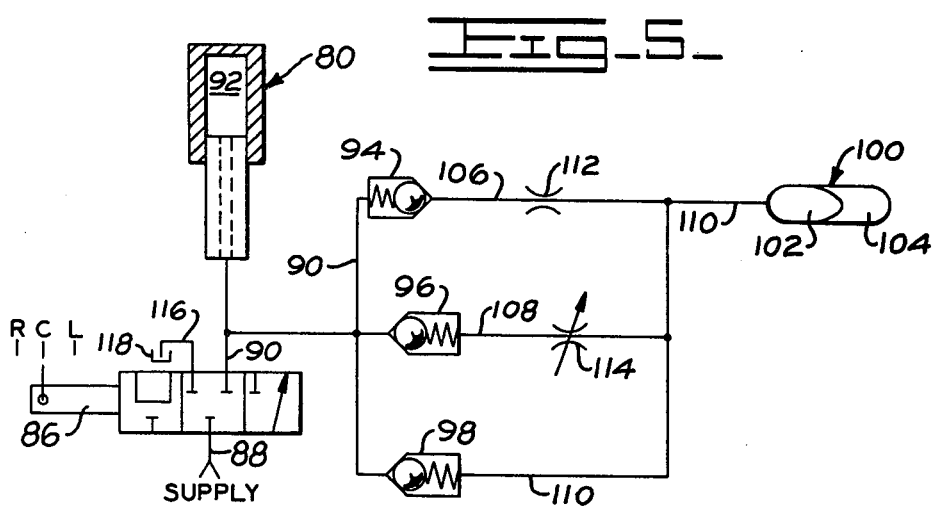
Fig-5-

VEHICLE SEAT

This is a division of Ser. No. 241,640, filed Mar. 6, 1972, now U.S. Pat. No. 3,788,697.

BACKGROUND OF THE INVENTION

Off-highway construction vehicles are normally required to operate on unimproved roadway surfaces. It is not unusual for haul roads to quickly develop a washboard surface subjecting vehicles to pronounced vertical motion or oscillation. An operator may have difficulty in maintaining control of the vehicle under such adverse operating conditions. In particular, comfort of the operator and his ability to control the vehicle is particularly dependent upon limiting or modulating movement of the seat and operator relative to the vehicle.

Various seat arrangements have been proposed which have improved vehicle control and operator comfort and safety. For example, U.S. Pat. No. 3,325,136, issued to A. O. Radke, et al., illustrates the use of a parallelogram seat linkage to limit horizontal backslapping motion in the seat. U.S. Pat. No. 3,356,413, likewise issued to Radke et al, shows an articulated linkage and roller arrangement designed to pivot the seat cushion about a point approximating the operator's knee joint. These separate developments improve the operator's ability to maintain control over the vehicle. However, such arrangements are relatively complex and further improvement in operator comfort and safety remains desirable.

SUMMARY OF THE INVENTION

The present invention provides an improved vehicle seat having a simplified linkage and suspension system which is sufficiently stable to permit the operator to maintain control of the vehicle during adverse operating conditions. For this purpose, the seat is supported by a parallelogram linkage and damping means with a swing linkage establishing a desired pattern for movement of the seat.

It is also an object of the present invention to provide a seat suspension system for limiting or modulating movement of the seat and operator relative to the vehicle.

Another object of this invention is to provide a suspension system for a vehicle seat which is capable of closely following the motion of an operator during upward travel of the seat so as to reduce the tendency of the operator to be separated from the seat.

Other objects and advantages of the present invention will become more readily apparent upon reference to the accompanying drawings and following description.

BRIEF DESCRIPTION OF THE DRAWINGS

FIG. 1 is a side elevational view of a seat embodying the principles of the present invention and showing the seat in its normal operating position.

FIG. 2 is a front elevational view of the seat of the present invention.

FIG. 3 is a somewhat reduced side elevational view of the seat in an extreme lowered position.

FIG. 4 is a somewhat reduced side elevational view of the seat of the present invention shown in an extreme raised position.

FIG. 5 is a schematic diagram of a hydraulic suspension circuit for the seat of the preceding figures.

DETAILED DESCRIPTION OF THE PREFERRED EMBODIMENT

With particular reference to FIGS. 1 and 2 of the drawings, a vehicle seat incorporating the principles of the present invention is generally indicated by the reference numeral 10. The seat is adapted to be mounted on the fixed frame 12 of a vehicle, not shown, such as an off-highway earthmoving machine or the like.

A seat base assembly is generally indicated by the reference numeral 14. The base has a pair of upwardly extending mounting brackets 16 joined at their forward edges to a front panel 18, a pair of outwardly extending mounting arms 20 and a pair of downwardly extending brackets 22. These elements are mounted on a horizontally disposed plate 24 which in turn is slidably mounted on a pair of adjustable track assemblies 26 to accommodate fore and aft adjustment of the vehicle seat with respect to the frame.

A parallelogram linkage is generally indicated by the reference numeral 28. The upper portion of the linkage consists of two upper links 30, each pivotally attached at a forward end to one of the mounting brackets 16 by a pin 32, and extending rearwardly along each side of the seat. Two lower links 34 are each pivotally attached at the forward end by a pin 36 to a corresponding mounting bracket 16 and extend rearwardly in substantially parallel relationship to the upper link 30. Two elongated swing links 38 are each pivotally attached by a pin 40 to one of the mounting arms 20 and extend upwardly and forwardly along each side of the vehicle seat 10 in transverse relationship with the parallelogram linkage 28.

A back support assembly, indicated generally by the reference numeral 42, has a curved frame 44 with forwardly extending sides, a contoured back cushion 46 joined to frame 44 and a depending bracket 48 attached to the frame. The depending bracket further has a pair of flanges 50 pivotally attached by pins 52 to the rearward ends of upper links 30 and to the rearward ends of lower links 34 by pins 54. The pins 52 and 54 are substantially the same distance apart as the forward pins 32 and 36. Since the upper and lower links 30 and 34 are of substantially equal length, a parallelogram structure is thus formed which tends to maintain the back support assembly 42 at a constant angle of inclination $\alpha$, with respect to the fixed frame 12 throughout vertical travel or oscillation of the vehicle seat assembly. This feature, producing a desirable back cushion action, is best illustrated in FIGS. 3 and 4 which respectively show the seat assembly 10 in its extreme lowered and raised limits of travel.

A bottom cushion assembly is generally indicated in FIGS. 1 and 2 by the reference numeral 56 and includes a generally horizontal panel 58 which is relatively flat except for a curved rim projecting downwardly around the periphery. A contoured cushion 60 is attached to the upper side of panel 58 and two depending arms 62 are joined to the bottom side of the panel. Each of the arms 62 is pivotally attached by a pin 64 to the upper end of one of the swing links 38 so that the bottom cushion assembly 56 may be tipped forward when not in use to protect cushion 60 from adverse weather conditions.

A saddle bracket assembly, generally indicated by the reference numeral 66, has a substantially flat panel 68 laterally disposed below the bottom cushion assembly 56. An upwardly extending arm 70 on each side of the saddle bracket is pivotally attached to the forwardly extending portion of the back cushion frame by pin 71. A pair of channel members 72 attached to panel 68 provide a rearwardly disposed support surface for the bottom cushion assembly. A pair of upwardly extending brackets 74 are attached to panel 68 on each side of an opening in the central portion of the panel. Forwardly extending arms 76 are attached to panel 68 and are pivotally joined at their respective forward ends along with the aforementioned arms 62 to the upper ends of swing links 38 by pins 64.

As best shown in FIGS. 3 and 4, the particular arrangement of the swing links 38 provides independent suspension of the bottom cushion assembly with respect to the parallelogram linkage 28 and permits the bottom cushion assembly to pivot about a point 78 above and in front of the bottom cushion forward edge approximate to the position of an operator's knee joint.

A seat supporting and movement damping link 80, having a cylinder end 82 pivotally attached to brackets 74 of the bottom cushion assembly and a rod end 84 pivotally attached to brackets 22 of the base, provides both support and damping for the vehicle seat. The mounting arrangement of link 80 enables the seat to be moved with respect to the frame 12 to accommodate the fore or aft adjustment requirement of a particular operator without changing the respective physical relationship of the seat linkage and support elements.

A hydraulic circuit for the seat supporting and movement damping link 80 is shown schematically in FIG. 5. A three-way, manually-operated valve 86 is connected between a conduit 88 providing a source of hydraulic fluid under pressure, such as from a vehicle hydraulic or transmission system, and a conduit 90 of the seat hydraulic circuit. Conduit 90 provides a fluid communicating passage between a working chamber 92 of the seat support and damping link 80, the vale 86, and three check valves 94, 96, and 98. The three check valves are in parallel communication between conduit 90 and an accumulator 100, having a fluid chamber 102 and a gas chamber 104, by conduits 106, 108, and 110, respectively. Conduit 106 contains a fixed orifice 112 in series connection with check valve 94. An adjustable orifice 114 is incorporated in conduit 108 in series connection with check valve 96. An additional conduit 116 places three-way valve 86 in communication with a reservoir 118.

The three-way, manually-operated valve 86 and variable orifice 114 are controlled by the operator and may be conveniently mounted on front panel 18 of the seat base as shown in FIGS. 1 and 2.

Operation

While operation of the present invention is believed clearly apparent from the foregoing description, further amplification is made in the following brief summary. The seat height is manually adjustable by means of the three-way valve 86. As indicated schematically in FIG. 5, moving the valve to the R or raise position places a supply conduit 88 in communication with a conduit 90, admitting additional fluid into the circuit and raising the seat. Positioning the valve in the L or lower position places conduit 90 in communication with a conduit 116 communicating with a reservoir 118, permitting fluid to drain from the circuit and lower the seat.

For normal operation, valve 86 is placed in the C or closed position. In this position, conduit 90 is blocked at valve 86 and the volume of hydraulic fluid in the circuit is fixed. As a vehicle equipped with the seat of the present invention operates across uneven terrain, an operator seated on the vehicle is subjected to vertical oscillatory motion resulting from elevational displacement of the vehicle. This action places an additional load on the seat during upward displacement of the vehicle. Downward displacement of the vehicle tends to decrease loading of the seat. Operation of the hydraulic support and damping circuit is described below with respect to each of these operating modes.

In the first operational mode, the seat is depressed in response to the additional load, thereby foreshortening a seat supporting and movement damping link 80 interposed between movable elements of the seat and a base which is fixed with respect to the vehicle. An internal working chamber 92 of link 80, pressurized with hydraulic fluid, is correspondingly foreshortened, thereby forcing hydraulic fluid from chamber 92 through a conduit 90 and a check valve 96, which is biased to open at a nominal pressure. Fluid flow continues through a conduit 108 and an adjustable orifice 114 to a conduit 110 and an accumulator 100. The accumulator has a compressible fluid, or gas, in a chamber 104 which is separated from a hydraulic fluid chamber 102 by a movable member or piston. Fluid thus entering accumulator 100 increases the volume of chamber 102, thereby decreasing the volume available for gas in chamber 104 and consequently increasing the pressure of the gas.

A reduction in seat load, considered as the second operational mode, introduces additional circuit elements. With a decrease in load on the seat, increased gas pressure in chamber 104 forces a return flow of fluid to working chamber 92 through the fixed orifice 112 and the check valve 94, biased to open at a nominal pressure, thus urging the seat back to its original position.

For a given fluid and operating environment, the rate of fluid flow of the damping circuit is a function of the orifice openings and the fluid pressure differential between conduits 90 and 110. For this reason, manually adjustable orifice 114 is conveniently mounted on a front panel 181 of the seat as shown in FIGS. 1 and 2, so that the operator may selectively regulate the amount of damping desired in the first operational mode. Although orifice 112 is shown schematically as a fixed orifice, it could also be a variable orifice if manual adjustment of return fluid flow is desired. In the present invention, it has been found that a fixed orifice provides acceptable modulation of the return flow so that the seat motion closely corresponds to the motion of the operator, thereby reducing any tendency of the seat to loft or pitch the operator.

Under adverse road surface conditions, the normal operating mode of the seat hydraulic system may not be adequate to isolate high impact forces. The present invention overcomes this problem by providing an additional flow path between the working chamber 92 and accumulator 100, augmenting the first operational mode. A check valve 98 is biased to open at a pressure substantially above the normal operating pressure. When normal operating pressures are exceeded, additional fluid may flow along a parallel path through conduit 90 to the conduit 110 and subsequently to accumulator 100. This feature provides reduced damping forces during high impact loads, thus contributing substantially to the safety and comfort of the operator and improving the operator's ability to maintain positive control of the vehicle.

In view of the foregoing, it is readily apparent that the structure of the present invention provides an improved vehicle seat which substantially increases the operator's ability to maintain control of a vehicle during adverse operating conditions. The present invention further provides a resilient suspension system having adjustable damping to meet normal requirements and an impact relief valve in the system to supply reduced damping foces in the seat suspension when high impact loads are encountered. It is also apparent that the present invention provides a seat which closely follows the motion of an operator during upward travel, thereby reducing the tendency of the operator to separate from the seat and further protecting the operator from injury during high impact loads.

While the invention has been described and shown with particular reference to the preferred embodiment, it will be apparent that many variations are possible within the scope of the present invention which is defined in the following claims.

We claim:

1. A suspension system for a vehicle seat, comprising a hydraulic cylinder effectively interconnected with said seat and responsive to vertical motion of the seat, the hydraulic cylinder including a working chamber containing hydraulic fluid and an inlet passage in communication with the working chamber, an accumulator, a first check valve means in communication with said cylinder inlet passage and said accumulator to regulate the rate of fluid flow from said cylinder working chamber to said accumulator and provide normal damping, said first check valve means comprising a check valve in series with a manually adjustable orifice, a second check valve means in parallel arrangement with said first check valve means, said second check valve means being biased to open at a higher pressure than said first check valve means to provide an additional path for fluid flow from said cylinder working chamber to said accumulator to provide impact damping, and a third check valve means in parallel arrangement with said first check valve means to provide for hydraulic fluid flow from said accumulator to said cylinder working chamber, said third check valve means comprising a check valve in series with an orifice.

2. The suspension system of claim 1 further comprising a source of hydraulic fluid under pressure, a fluid drain means and a valve for selectively communicating the cylinder inlet passage with the source and fluid drain means.

* * * * *

UNITED STATES PATENT OFFICE
CERTIFICATE OF CORRECTION

PATENT NO. : 3,879,007
DATED : April 22, 1975
INVENTOR(S) : James C. Barton, et al It is certified that error appears in the above-identified patent and that said Letters Patent are hereby corrected as shown below:

On the Title Page, Item [73], change the spelling of the assignee's corporate name from "Caterpillar Tractor Company" to --- Caterpillar Tractor Co. ---.

Signed and Sealed this twenty-second Day of July 1975

[SEAL]

Attest:

RUTH C. MASON
Attesting Officer

C. MARSHALL DANN
Commissioner of Patents and Trademarks